(12) United States Patent
Lin

(10) Patent No.: US 11,696,624 B2
(45) Date of Patent: Jul. 11, 2023

(54) FASTENER STRINGER AND SLIDE FASTENER PROVIDED WITH THE FASTENER STRINGER

(71) Applicant: YKK CORPORATION, Tokyo (JP)

(72) Inventor: Chih Hung Lin, Taipei (TW)

(73) Assignee: YKK CORPORATION

( * ) Notice: Subject to any disclaimer, the term of this patent is extended or adjusted under 35 U.S.C. 154(b) by 251 days.

(21) Appl. No.: 16/986,525

(22) Filed: Aug. 6, 2020

(65) Prior Publication Data

US 2021/0037930 A1 Feb. 11, 2021

(30) Foreign Application Priority Data

Aug. 8, 2019 (CN) .......................... 201921286320.2

(51) Int. Cl.
*A44B 19/34* (2006.01)
*B32B 5/02* (2006.01)
*B32B 7/12* (2006.01)
*B32B 5/24* (2006.01)

(52) U.S. Cl.
CPC ............ *A44B 19/346* (2013.01); *B32B 5/024* (2013.01); *B32B 5/24* (2013.01); *B32B 7/12* (2013.01); *B32B 2262/0276* (2013.01); *B32B 2262/0292* (2013.01); *B32B 2307/416* (2013.01)

(58) Field of Classification Search
CPC ......... A44B 19/346; B32B 5/024; B32B 5/24; B32B 7/12; B32B 2262/0276; B32B 2262/0292; B32B 2307/416; B32B 5/26; B32B 2307/54; B32B 2307/73; B32B 2437/00; A41D 13/01
See application file for complete search history.

(56) References Cited

U.S. PATENT DOCUMENTS

| 4,724,586 A | 2/1988 | Tsubokawa et al. |
| 4,922,585 A | 5/1990 | Suzuki et al. |
| 6,180,545 B1 * | 1/2001 | Okeya ................. A44B 19/343 442/232 |
| 2015/0366300 A1 * | 12/2015 | Sho ...................... A44B 19/406 24/396 |

FOREIGN PATENT DOCUMENTS

| JP | S6314963 | 4/1988 |
| JP | H479242 | 12/1992 |
| TW | 576144 | 2/2004 |

* cited by examiner

*Primary Examiner* — David M Upchurch
(74) *Attorney, Agent, or Firm* — Taylor English Duma LLP

(57) ABSTRACT

A fastener stringer used for a slide fastener, including: a pair of fastener tapes including a stretchable yarn; a pair of fastener element rows mounted on opposite side edge portions of the pair of fastener tapes, respectively; and a reflective film disposed on a front or back surface of one of the fastener tapes. The reflective film has stretchability.

15 Claims, 8 Drawing Sheets

FASTENER STRINGER AND SLIDE FASTENER PROVIDED WITH THE FASTENER STRINGER

CROSS-REFERENCE TO RELATED APPLICATIONS

This application is based on Chinese Utility Model Application No. 201921286320.2 filed on Aug. 8, 2019, the contents of which are incorporated herein by way of reference.

BACKGROUND

The present invention relates to a fastener stringer and a slide fastener provided with the fastener stringer.

A slide fastener is often used as an opening and closing member for articles such as clothing. Generally speaking, a slide fastener has: a fastener stringer having a pair of fastener tapes and a pair of element rows mounted on side edge portions of the pair of fastener tapes, respectively; and a slider engaging or disengaging the element rows to open and close the slide fastener.

Tapes 1 used as fastener tapes of a slide fastener disclosed in Patent Document 1 have an adhesive layer 41 and a film 42 on the surface of the tapes 1. The film 42 has a reflection function.

Further, a slide fastener disclosed in Patent Document 2 is provided with fastener element row portions 3 in which a plurality of fastener elements 2 are arranged on side edges of fastener tapes 1. A retroreflective tape 5 is continuously mounted on each of fastener elements 2 in the length direction of the surface of the fastener element row portion 3. The retroreflective tape 5 itself has stretchability and is sufficiently thin.

Further, a slide fastener A disclosed in Patent Document 3 uses a waterproof tape 1 which has waterproof which is formed by coating a soft seal member 3 such as synthetic rubber or soft synthetic resin on one surface or both surfaces of a fabric tape 2. The fabric tape 2 is a woven fabric using elastic yarns as weft yarns or a known knitted fabric extending in a transverse direction, and therefore, the waterproof tape 1 is at least transversely stretchable.

[Patent Document 1] Taiwan Utility Model TW576144U
[Patent Document 2] JP-B2-H4-79242
[Patent Document 3] JP-B2-S63-14963

The film 42 having the reflection function in Patent Document 1 is fixed to the surface of the tapes 1 via the adhesive layer 41, and thus the slide fastener has the reflection function. However, Patent Document 1 does not disclose that the tapes 1 and the film 42 have stretchability. In other words, no consideration is given to the stretchability relationship between the fastener tape and the film disposed on the fastener tape.

Further, although the retroreflective film 5 of Patent Document 2 is stretchable, the width of the retroreflective film 5 is very narrow and the reflection range is very narrow since the retroreflective film 5 is mounted on each of the fastener elements 2 in the length direction of the surface of the fastener element row portion 3. Therefore, there is a problem that the reflection effect is insufficient. Further, it does not disclose that the fastener tapes 1 have stretchability. On the other hand, although the retroreflective film 5 has stretchability, the retroreflective film 5 is not disposed on the fastener tapes 1. In other words, no consideration is given to the stretchability relationship between the fastener tape and the retroreflective film disposed on the fastener tape.

Further, although the fabric tape 2 of Patent Document 3 is stretchable, a reflective film is not included, and therefore there is a problem of not having a reflection function. Further, even if Patent Documents 2 and 3 are combined, a problem of insufficient reflection effect remains. Further, even if the retroreflective film of Patent Document 2 is applied to the structure of Patent Document 3, the retroreflective film is merely continuously mounted on each of the elements 6 in the length direction of the surface of the elements 6 of Patent Document 3. In other words, no consideration is given to the stretchability relationship between the fabric tape and the retroreflective film disposed on the fabric tape.

Furthermore, even if Patent Documents 1 and 3 are combined, since the film does not have stretchability, the film is easily damaged and easily peeled off from the fastener tapes when a force is applied to the fastener tapes.

SUMMARY

In view of the above-mentioned problems, an object of the present invention is to provide a fastener stringer having a significant reflection effect, having a stretchable function, capable of maintaining an elongation and having high durability, and a slide fastener provided with the fastener stringer.

According to one advantageous aspect of the present invention, there is provided a fastener stringer used for a slide fastener, including: a pair of fastener tapes including a stretchable yarn; a pair of fastener element rows mounted on opposite side edge portions of the pair of fastener tapes, respectively; and a reflective film disposed on a front or back surface of one of the fastener tapes. The reflective film has stretchability.

Further, in the fastener stringer according to other advantageous aspect of the present invention, the fastener tapes are woven from a non-stretchable warp yarn and a stretchable weft yarn.

Further, in the fastener stringer according to other advantageous aspect of the present invention, the reflective film is a retroreflective film.

Further, in the fastener stringer according to other advantageous aspect of the present invention, the fastener element rows are disposed on the back surfaces of the fastener tapes, and the reflective film is disposed from one side edge portion to other side edge portion of the front surface of the one of the fastener tapes.

Further, in the fastener stringer according to other advantageous aspect of the present invention, the reflective film is disposed from an outer side edge portion of one of the fastener element rows to a side edge portion of the one of the fastener tapes.

Further, in the fastener stringer according to other advantageous aspect of the present invention, a pattern or a color is applied to the reflective film.

Further, in the fastener stringer according to other advantageous aspect of the present invention, when a load of 9.8 N is applied in a width direction of the fastener stringer, the fastener stringer has an elongation of 15.2% to 18.3% in the width direction.

Further, in the fastener stringer according to other advantageous aspect of the present invention, when a load of 19.6 N is applied in a width direction of the fastener stringer, the fastener stringer has an elongation of 25.5% to 30.7% in the width direction.

Further, in the fastener stringer according to other advantageous aspect of the present invention, when a load of 39.2

N is applied in a width direction of the fastener stringer, the fastener stringer has an elongation of 43.2% to 50.1% in the width direction.

Further, in the fastener stringer according to other advantageous aspect of the present invention, the reflective film is disposed on both the front and back surfaces of the one of the fastener tapes.

Further, in the fastener stringer according to other advantageous aspect of the present invention, the reflective film is subjected to waterproof treatment and/or water repellent treatment.

Further, according to other advantageous aspect of the present invention, there is a slide fastener including the above fastener stringer.

DESCRIPTION OF EMBODIMENTS

Hereinafter, a fastener stringer 1 according to an embodiment of the present invention will be described with reference to FIGS. 1 to 4. The present invention is not limited to embodiments to be described below, and as long as the substantially the same configuration as the present invention is provided and the same effect is achieved, various changes may be made.

Figure 1:
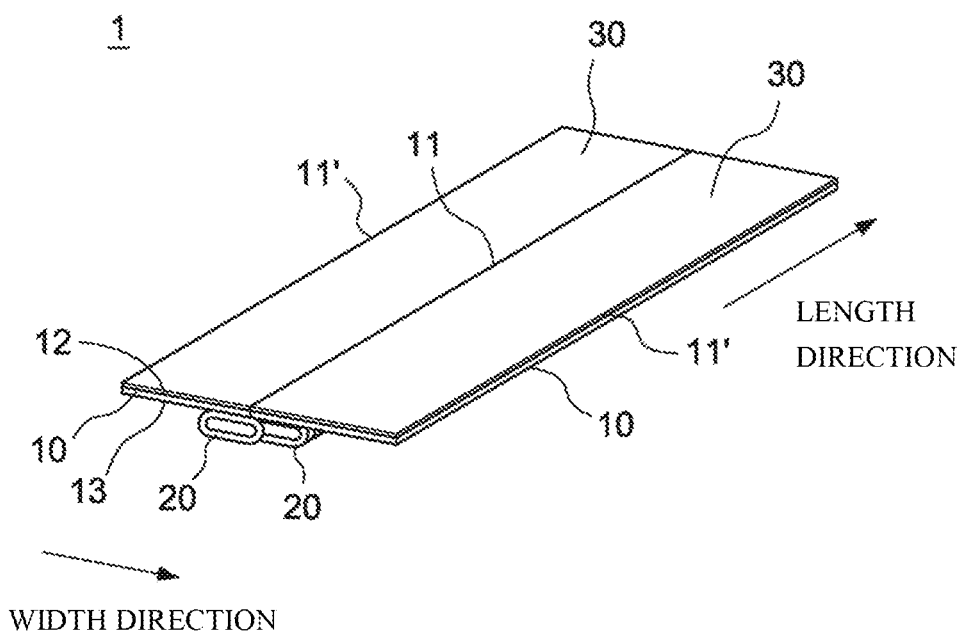
FIG. 1 is a perspective view of a fastener stringer according to an embodiment of the present invention.

In the following description, as shown in FIG. 1, a length direction refers to a direction along a length of a fastener stringer 1. Further, a width direction refers to a direction along a width of the fastener stringer 1. In addition, the width direction is a direction orthogonal to the length direction.

Generally, a slide fastener (not shown) includes a fastener stringer 1 and a slider (not shown). In the fastener stringer 1, a pair of fastener element rows 20 are mounted on opposite side edge portions 11 of a pair of fastener tapes 10 in a length direction of the fastener tapes 10, respectively. The fastener stringer 1 is closed by advancement of the slider, and the left and right fastener element rows 20 are brought into an engaged state. Further, the fastener stringer 1 is opened by retreat of the slider, and the left and right fastener element rows 20 are brought into a disengaged state.

First Embodiment

Figure 2:
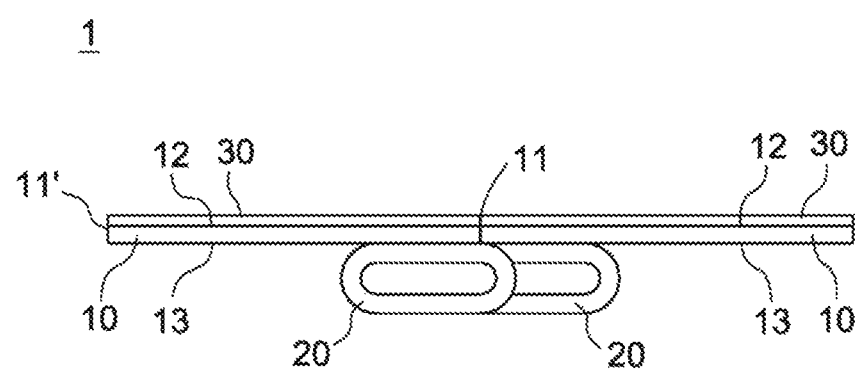
FIG. 2 is a cross-sectional view of a fastener stringer according to an embodiment of the present invention.
Figure 3:
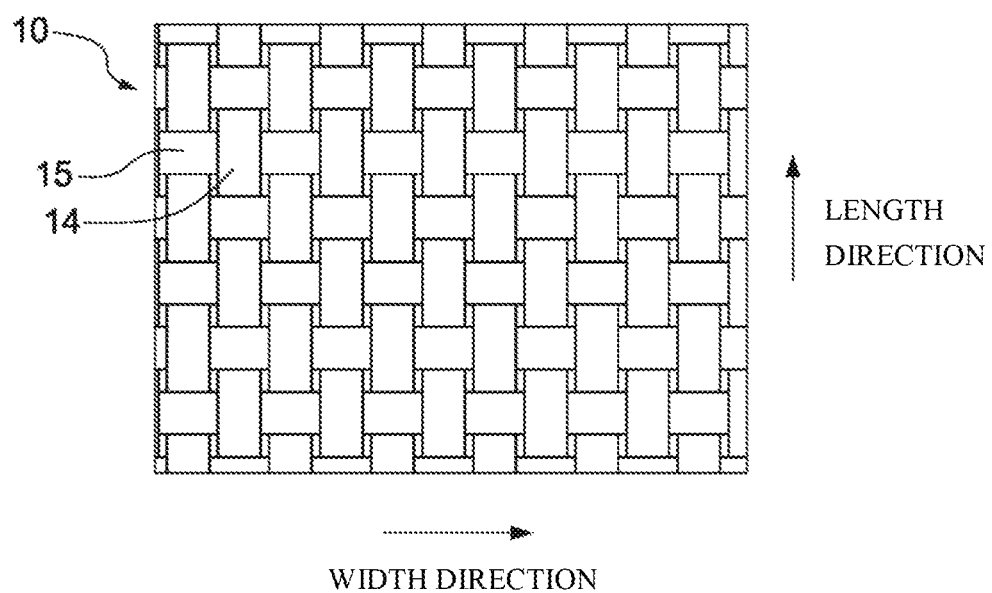
FIG. 3 is a partially enlarged view of a fastener tape of a fastener stringer according to an embodiment of the present invention.
Figure 4:
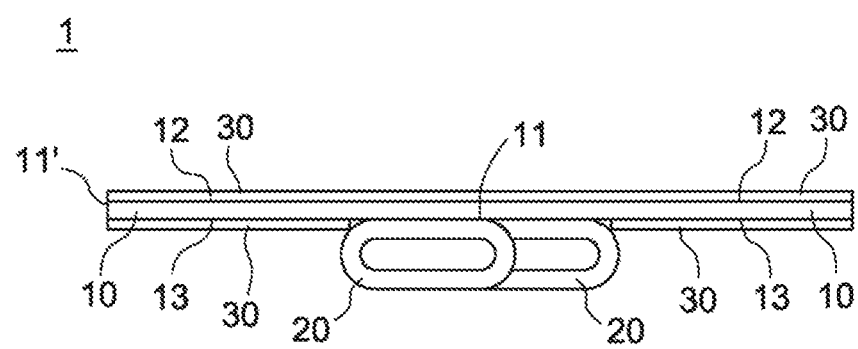
FIG. 4 is a cross-sectional view in which reflective films are disposed on front and back surfaces of fastener tapes according to an embodiment of the present invention.

Hereinafter, an overall structure of the fastener stringer 1 according to the present invention will be described with reference to FIGS. 1 to 4. FIG. 1 is a perspective view of a fastener stringer according to an embodiment of the present invention. FIG. 2 is a cross-sectional view of a fastener stringer according to an embodiment of the present invention. FIG. 3 is a partially enlarged view of a fastener tape of a fastener stringer according to an embodiment of the present invention. FIG. 4 is a cross-sectional view in which reflective films are disposed on front and back surfaces of fastener tapes according to an embodiment of the present invention.

[Configuration of Fastener Stringer 1]

As shown in FIGS. 1 to 4, a fastener stringer 1 includes: a pair of fastener tapes 10 having stretchability; a pair of fastener element rows 20 mounted on opposite side edge portions 11 of the pair of fastener tapes 10, respectively; and stretchable reflective films 30 disposed on front surfaces 12 of the fastener tapes 10. Further, in the embodiment, a so-called reversed slide fastener is described. In the reversed slide fastener, the fastener element rows 20 are only disposed on back surfaces 13 of the fastener tapes 10 and not exposed on the front surfaces 12 of the fastener tapes 10.

[Configuration of Fastener Tape 10]

As shown in FIG. 3, the fastener tape 10 has a structure woven with a warp yarn 14 and a weft yarn 15. Further, the fastener tape 10 is woven from the non-stretchable warp yarn 14 and the stretchable weft yarn 15, and thus has stretchability in a width direction. However, the fastener tape 10 may also be woven from the stretchable warp yarn and the stretchable weft yarn. As a result, the fastener tape 10 may have stretchability in both the length direction and the width direction. In addition, the fastener tape 10 may be woven from a stretchable warp yarn and a non-stretchable weft yarn, and thus may have stretchability in the length direction.

As a stretchable yarn, for example, a spandex elastic fiber (Spandex) covered yarn is used. The spandex elastic fiber covered yarn is formed by winding a polyester filament yarn around a polyurethane elastic yarn. Further, as a non-stretchable yarn, for example, a polyester processed yarn is used.

In addition, materials of the stretchable yarn and the non-stretchable yarn are not limited to the above description, and the stretchable yarn can be appropriately selected from other rubber yarns including an elastomer or a covered yarn formed by winding a textile yarn or a filament around the rubber yarn, or the like. Further, as the non-stretchable yarn, conventionally used yarns such as textile yarns, monofilaments, and multifilaments, may be used. Further, the thickness of the stretchable yarn and the non-stretchable yarn is not particularly limited. For example, it is preferable to use a stretchable yarn and a non-stretchable yarn which are capable of giving the fastener tape 10 appropriate strength, and which are formed with a thickness through which a sewing needle can be inserted when the fastener element row 20 is sewn to the fastener tape 10.

[Configuration of Reflective Film 30]

As the reflective film 30, a stretchable reflective film is used. The method of disposing the reflective film 30 on the front surface 12 of the fastener tape 10 is, for example, that a hot-melt hot adhesive is provided on one surface of the reflective film 30 and that the reflective film 30 is overlapped with the fastener tape 10 in a manner where the hot adhesive is opposed against the fastener tape 10. Next, for example, a heat welding device or an ultrasonic welding device is used to weld the hot adhesive to the fastener tape 10, and the reflective film 30 is crimped to the front surface 12 of the fastener tape 10. After that, the fastener tape 10 and the reflective film 30 are cooled by a cooling device or waited for natural cooling to obtain the fastener tape 10 in which the stretchable reflective film 30 is disposed.

Further, in the embodiment, the reflective film 30 is disposed on the front surface 12 of the fastener tape 10, but the reflective film 30 may also be disposed on the back surface 13 of the fastener tape 10. Further, as shown in FIG. 4, the reflective films 30 may be disposed on both the front surface 12 and the back surface 13 of the fastener tape 10. In addition, the reflective film 30 may be disposed only on any one of the pair of fastener tapes 10.

In the embodiment, since the reflective film 30 is disposed on the surface of the fastener tape 10, the width and area of reflection are wider, and a significant reflection effect can be achieved, compared with the prior art of Patent Document 2 in which the reflective member is disposed on the element row.

Further, in the embodiment, since a stretchable article is used in both the fastener tape 10 and the reflective film 30, the fastener tape 10 on which the reflective film 30 is disposed, is given a good stretchable function as a whole. As a result, even if a tensile force is applied to the fastener stringer 1 or the fastener tape 10 for elongation, the reflective film 30 will be elongated together with the fastener tape 10, and thus the reflective film 30 is not easily damaged, and not easily peeled off from the fastener tape 10. As a result, the reflective fastener stringer 1 can also have high durability.

[Measurement of Elongation of Fastener Stringer 1]

Figure 5:
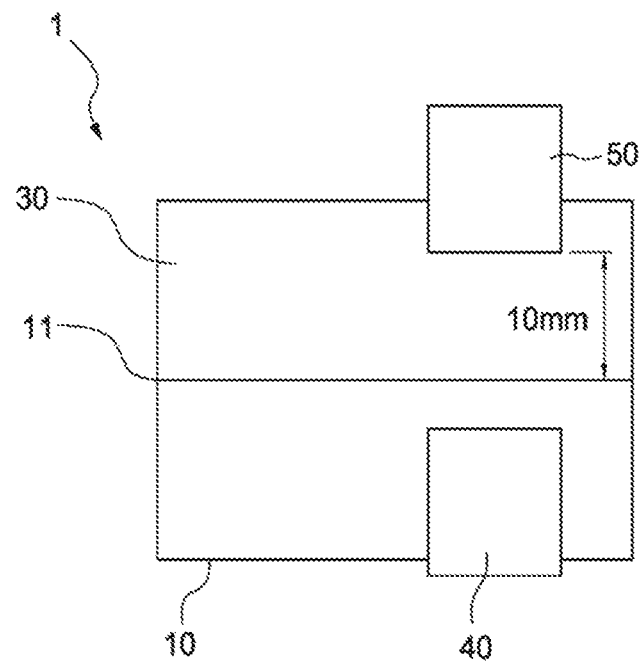
FIG. 5 is a top view showing a positional relationship between a tool for measuring an elongation of fastener tapes and the fastener tapes.
Figure 6:
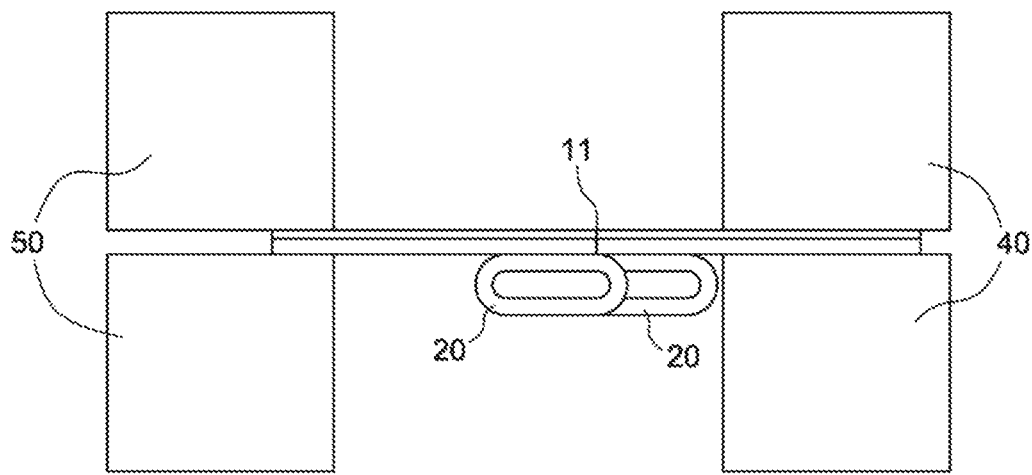
FIG. 6 is a cross-sectional view showing a positional relationship between a tool for measuring an elongation of fastener tapes and the fastener tapes.

As shown in FIGS. 5 and 6, in order to measure the elongation of the entire fastener stringer 1 in a case where the stretchable reflective film 30 is disposed on the front surface 12 of the fastener tape 10, in a state where the left and right fastener element rows 20 are in an engaged state, one fastener tape 10 is fixed by a fixing member 40 along an outer side edge portion of one of the fastener element row 20. Furthermore, the other fastener tape 10 is sandwiched by a clamp 50 at a position away from a side edge portion 11 of the other fastener tape 10 by 10 mm, in the other fastener tape 10. Next, by moving the clamp 50 outward in the width direction, a load of a different size in the width direction is applied to the other fastener tape 10, and an elongation of the fastener tape 10 is measured. Measurement results of the elongation are shown in the following [Table 1].

TABLE 1

A case where the reflective film is disposed on the surface of the fastener tape

| Measurement order | Elongation of fastener tape caused by different tensile forces | | |
|---|---|---|---|
| | 9.8 N | 19.6 N | 39.2 N |
| | Elongation (%) | | |
| 1 | 16.3 | 28.7 | 48.9 |
| 2 | 15.2 | 26.4 | 44.5 |
| 3 | 16.9 | 28.3 | 46.0 |
| 4 | 16.6 | 27.8 | 45.3 |
| 5 | 16.3 | 27.7 | 46.5 |
| 6 | 15.5 | 25.5 | 43.2 |
| 7 | 18.0 | 29.0 | 46.1 |
| 8 | 16.4 | 27.6 | 45.2 |
| 9 | 16.8 | 27.4 | 46.2 |
| 10 | 18.3 | 30.7 | 50.1 |
| Max. | 18.3 | 30.7 | 50.1 |
| Min. | 15.2 | 25.5 | 43.2 |
| Ave. | 16.6 | 27.9 | 46.2 |

As shown in Table 1, when a load of 9.8 N is applied in a width direction of the fastener stringer 1, the fastener stringer 1 has an elongation of about 15.2% to 18.3% in the width direction; when a load of 19.6 N is applied in a width direction of the fastener stringer 1, the fastener stringer 1 has an elongation of about 25.5% to 30.7% in the width direction; and when a load of 39.2 N is applied in a width direction of the fastener stringer 1, the fastener stringer 1 has an elongation of about 43.2% to 50.1% in the width direction.

Comparative Example

Further, measurement results of the elongation of the fastener tape 10 without a reflective film are shown in the following [Table 2].

TABLE 2

A case without a reflective film

| Measurement order | Elongation of fastener tape caused by different tensile forces | | |
|---|---|---|---|
| | 9.8 N | 19.6 N | 39.2 N |
| | Elongation (%) | | |
| 1 | 23.9 | 36.7 | 51.2 |
| 2 | 22.7 | 35.2 | 49.6 |
| 3 | 22.3 | 34.8 | 49.1 |
| 4 | 22.2 | 34.8 | 49.3 |
| 5 | 22.4 | 34.7 | 48.7 |
| 6 | 22.8 | 35.9 | 50.3 |
| 7 | 21.3 | 34.6 | 49.1 |
| 8 | 23.3 | 36.4 | 50.9 |
| 9 | 20.5 | 33.5 | 48.0 |
| 10 | 24.5 | 38.1 | 53.2 |
| Max. | 24.5 | 38.1 | 53.2 |
| Min. | 20.5 | 33.5 | 48.0 |
| Ave. | 22.6 | 35.5 | 49.9 |

According to the measurement results of Table 1 and Table 2, in the fastener stringer 1 of the present invention, even if the reflective film 30 is disposed on one surface of the fastener tape 10, since the reflective film 30 has stretchability, a reduction rate of the elongation in the width direction is about 7.4% to 26.5%, and a certain elongation can also be maintained, and further an excellent stretchable function can be provided, as shown in comparison in Table 3.

TABLE 3

Comparison between the case with a reflective film and the case without a reflective film

| | Average elongation of fastener tape caused by different tensile forces | | |
|---|---|---|---|
| | 9.8 N | 19.6 N | 39.2 N |
| | Average elongation (%) | | |
| Ave. in the case without a reflective film | 22.6 | 35.5 | 49.9 |
| Ave. in the case with a reflective film | 16.6 | 27.9 | 46.2 |
| Reduction value | 6 | 7.6 | 3.7 |
| Reduction rate (%) | 26.5 | 21.4 | 7.4 |

In addition, the reflective film 30 used in the present invention is a stretchable retroreflective film. As a result, the reflection effect can be further improved. However, the reflective film 30 is not limited to a retroreflective film, and the reflective film 30 may be a diffuse reflective film or a regular reflective film as long as it has stretchability.

Further, in some aspects, a pattern or a color may not be applied to the reflective film 30. In some aspects, a pattern or a color (not shown) may be applied to the reflective film 30. As a result, a reflection effect can be further improved, and designability can be provided. Further, the pattern or the color may also be adjusted according to user needs.

[Positional Relationship Between Reflective Film 30 and Fastener Tape 10]

As shown in FIGS. 1 and 2, the reflective film 30 is preferably disposed from one side edge portion 11 to the other side edge portion 11' of the front surface 12 of the fastener tape 10. As a result, reflection area is increased, and therefore the reflection effect can be further improved.

Further, the reflective film 30 may be disposed not only on the front surface 12 but also on the back surface 13 which is a surface where the fastener element row 20 exists. In a case where the reflective film 30 is disposed on the back surface 13 which is the surface where the fastener element row 20 of the fastener tape 10 exists, the reflective film 30 is preferably disposed in a manner of not overlapping with the fastener element row 20 mounted in the subsequent step. That is, the reflective film 30 disposed on the back surface 13 is preferably disposed in an area of the fastener tape 10 from a position of an outer side edge portion of the fastener element row 20 mounted in the subsequent step to the other side edge portion 11' of the fastener tape 10. As a result, the back surface 13 of the fastener tape 10 can be given the reflection effect, and the use amount of the reflective film 30 can be reduced, so that manufacturing costs can be reduced.

Figure 7:
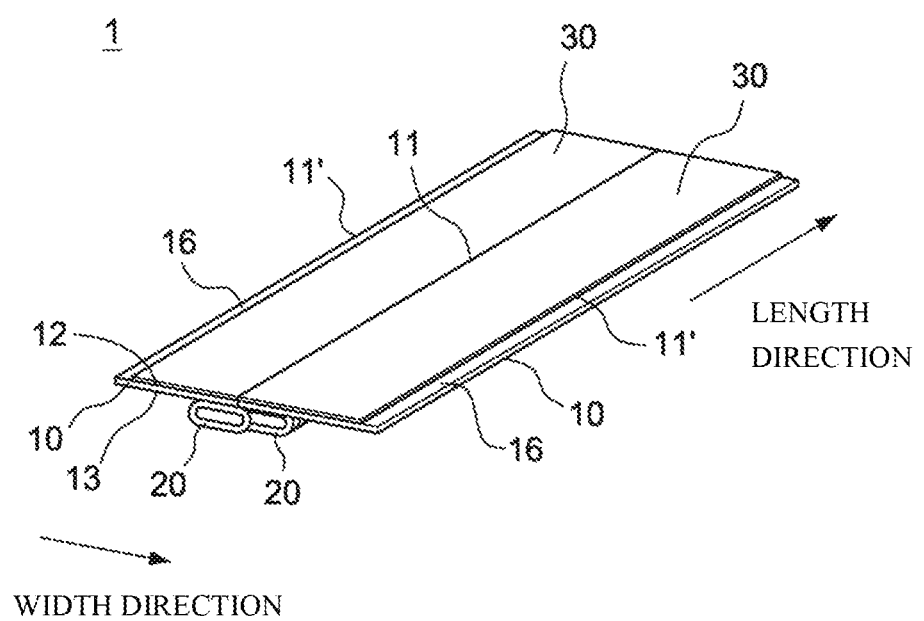
FIG. 7 is a top view of a fastener stringer having a sewing margin according to an embodiment of the present invention.

In addition, in the above description, the case where the reflective film 30 disposed on the front surface 12 or the back surface 13 is disposed on the other side edge portion 11' of the fastener tape 10, has been described. However, as shown in FIG. 7, the reflective film 30 may not be provided in a portion that is a sewing margin 16 for sewing a slider of a slide fastener to articles such as clothes or bags. That is, an area to a position slightly retreating inward from the other side edge portion 11' of the fastener tape 10 is left as the sewing margin 16, and the reflective film 30 is not disposed only at this position. As a result, the reflection effect of the fastener tape 10 can be provided, and the use amount of the reflective film 30 can be reduced, so that manufacturing costs can be reduced.

Further, the reflective film 30 may be subjected to waterproof treatment (not shown) or/and water repellent treatment (not shown). The waterproof treatment is, for example, to form a waterproof layer by coating a waterproof material such as synthetic rubber or soft synthetic resin or attaching a waterproof tape. As a result, the fastener stringer 1 can have a water stop function.

Next, a slide fastener (not shown) formed by using the fastener stringer 1 according to the present invention will be described. The slide fastener is formed by inserting the above-described fastener stringer 1 through a slider (not shown). The fastener stringer 1 of the present invention has a significant reflection effect, and has a stretchable function, is capable of maintaining an elongation and has high durability. Therefore, the slide fastener formed by using the fastener stringer 1 of the present invention also can achieve the above effects. Further, a user wearing clothes with the slide fastener formed by using the fastener stringer 1 of the present invention can enjoy the reflection effect of the fastener stringer 1 and the safety during wearing can be improved through reflecting light.

Second Embodiment

Figure 8:
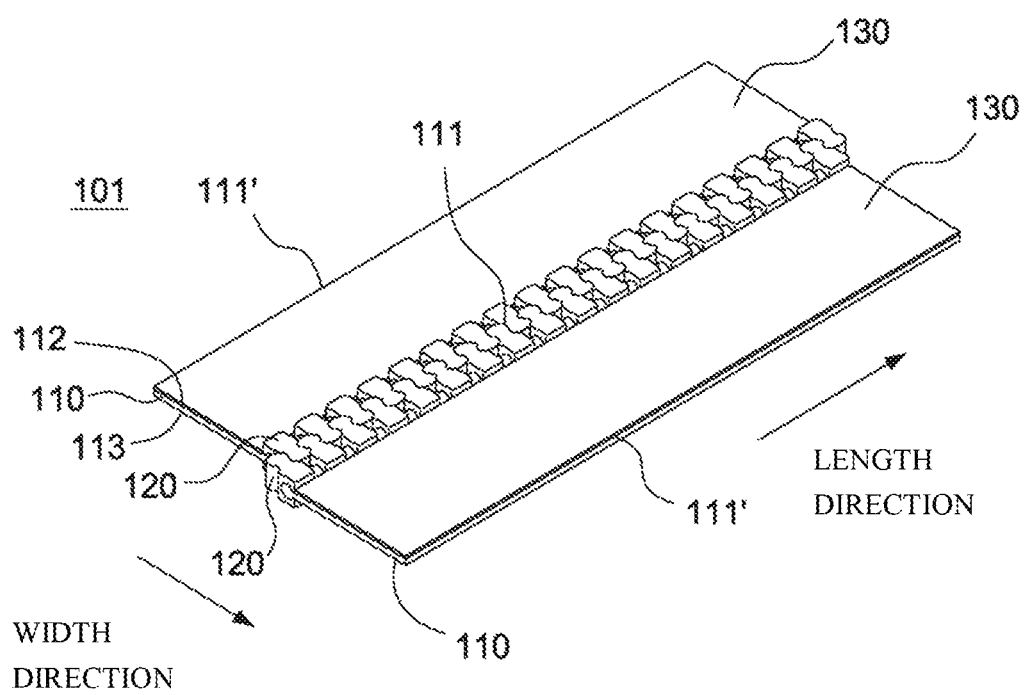
FIG. 8 is a perspective view of a fastener stringer according to another embodiment of the present invention.

FIG. 8 is a perspective view of a fastener stringer according to another embodiment of the present invention. In the description of the embodiment and its reference drawing, members having the same configuration as the members described in the above embodiment are denoted by the same signs, and description of the members are omitted by using the same signs as described above.

In the first embodiment, the case where the reflective film 30 is disposed on the front surface 12 and/or the back surface 13 of the fastener tape 10 of the fastener stringer 1 of the reversed slide fastener, is described. However, in the second embodiment, a case where a reflective film 130 is disposed in a fastener stringer 101 of a slider fastener which does not belong to a reversed slide fastener, will be described.

The slide fastener (not shown) of the second embodiment also includes the fastener stringer 101 and a slider (not shown). As shown in FIG. 8, in the fastener stringer 101 of the second embodiment, a pair of fastener element rows 120 are mounted on opposite side edge portions 111 of a pair of fastener tapes 110 in a length direction of the fastener tapes 110, respectively. The fastener element rows 120 provided on the opposite side edge portions 111 of the pair of fastener tapes 110 are exposed not only on a back surface 113 but also a front surface 112 of the fastener tapes 110. Further, the material of the fastener element rows 120 may be metal or resin. The reflective film 130 is preferably disposed in a manner of not overlapping with the fastener element row 120 mounted in the subsequent step. In other words, the reflective film 130 is preferably disposed in an area of the fastener tapes 110 from a position of an outer side edge portion of the fastener element row 120 mounted in the subsequent step to the other side edge portion 111' of the fastener tape 110. As a result, the fastener tape 110 can be given the reflection effect, and the use amount of the reflective film 130 can be reduced, so that manufacturing costs can be reduced. Further, the reflective film 130 may be disposed on the front surface 112 or the back surface 113 of the fastener tape 110, or on both the front surface 112 and the back surface 113 of the fastener tape 110. In addition, the reflective film 130 may also be disposed from one side edge portion 111 of the front surface 112 or/and the back surface 113 of the fastener tape 110 to the other side edge portion 111'. In addition, the reflective film 130 may be disposed only on any one of the pair of fastener tapes 110.

Further, in second embodiment, the reflective film 130 may not be provided in a portion that is a sewing margin for sewing articles in which a slide fastener is used. That is, an area to a position slightly retreating inward from the other side edge portion 111' of the fastener tape 110 is left as a sewing margin, and the reflective film 130 is not disposed only at this position. As a result, the reflection effect of the fastener tape 110 can be provided, and the use amount of the reflective film 130 can be reduced, so that manufacturing costs can be reduced.

The embodiments of the present invention have been described above based on accompanying drawings, but the specific configuration is not limited to these embodiments. The scope of the present invention is not indicated by the description of the above-mentioned embodiments, but is indicated by the claims, and further includes all changes within the meaning and scope equivalent to the claims.

What is claimed is:

1. A fastener stringer used for a slide fastener, comprising:
a pair of fastener tapes including a stretchable yarn;
a pair of fastener element rows mounted on opposite side edge portions of the pair of fastener tapes, respectively; and
a reflective film disposed on and covering at least a portion of a front surface or a portion of a back surface of one of the fastener tapes,
wherein the reflective film has stretchability;
wherein the reflective film defines an outermost surface of the fastener stringer where the reflective film is present; and
wherein when a load of 9.8 N is applied in a width direction of the fastener stringer, the fastener stringer has an elongation of 15.2% to 18.3% in the width direction.

2. The fastener stringer according to claim 1,
wherein the fastener tapes are woven from a non-stretchable warp yarn and a stretchable weft yarn.

3. The fastener stringer according to claim 1,
wherein the reflective film is a retroreflective film.

4. The fastener stringer according to claim 1,
wherein the fastener element rows are disposed on the back surfaces of the fastener tapes, and
wherein the reflective film is disposed from one side edge portion to other side edge portion of the front surface of the one of the fastener tapes.

5. The fastener stringer according to claim 1,
wherein the reflective film is disposed from an outer side edge portion of one of the fastener element rows to a side edge portion of the one of the fastener tapes.

6. The fastener stringer according to claim 1,
wherein a pattern or a color is applied to the reflective film.

7. The fastener stringer according to claim 1,
wherein when a load of 19.6 N is applied in a width direction of the fastener stringer, the fastener stringer has an elongation of 25.5% to 30.7% in the width direction.

8. The fastener stringer according to claim 1,
wherein when a load of 39.2 N is applied in a width direction of the fastener stringer, the fastener stringer has an elongation of 43.2% to 50.1% in the width direction.

9. The fastener stringer according to claim 1,
wherein the reflective film is disposed on both the front and back surfaces of the one of the fastener tapes.

10. The fastener stringer according to claim 1,
wherein the reflective film is subjected to waterproof treatment and/or water repellent treatment.

11. A slide fastener comprising the fastener stringer according to claim 1.

12. A fastener stringer used for a slide fastener, comprising:
a pair of fastener tapes including a stretchable yarn;
a pair of fastener element rows mounted on opposite side edge portions of the pair of fastener tapes, respectively; and
a reflective film disposed on a front or back surface of one of the fastener tapes,
wherein the reflective film has stretchability, and
wherein when a load of 9.8 N is applied in a width direction of the fastener stringer, the fastener stringer has an elongation of 15.2% to 18.3% in the width direction.

13. A fastener stringer used for a slide fastener, comprising:
a pair of fastener tapes including a stretchable yarn;
a pair of fastener element rows mounted on opposite side edge portions of the pair of fastener tapes, respectively; and
a reflective film disposed on a front or back surface of one of the fastener tapes,
wherein the reflective film has stretchability, and
wherein when a load of 19.6 N is applied in a width direction of the fastener stringer, the fastener stringer has an elongation of 25.5% to 30.7% in the width direction.

14. The fastener stringer according to claim 1,
wherein the reflective film is secured to the front surface or the back surface with an adhesive.

15. The fastener stringer according to claim 14,
wherein the adhesive is a hot-melt adhesive.

* * * * *